(No Model.)
L. E. PAINE.
COMBINED SANDPAPERING AND FRIEZING MACHINE.
No. 450,337. Patented Apr. 14, 1891.
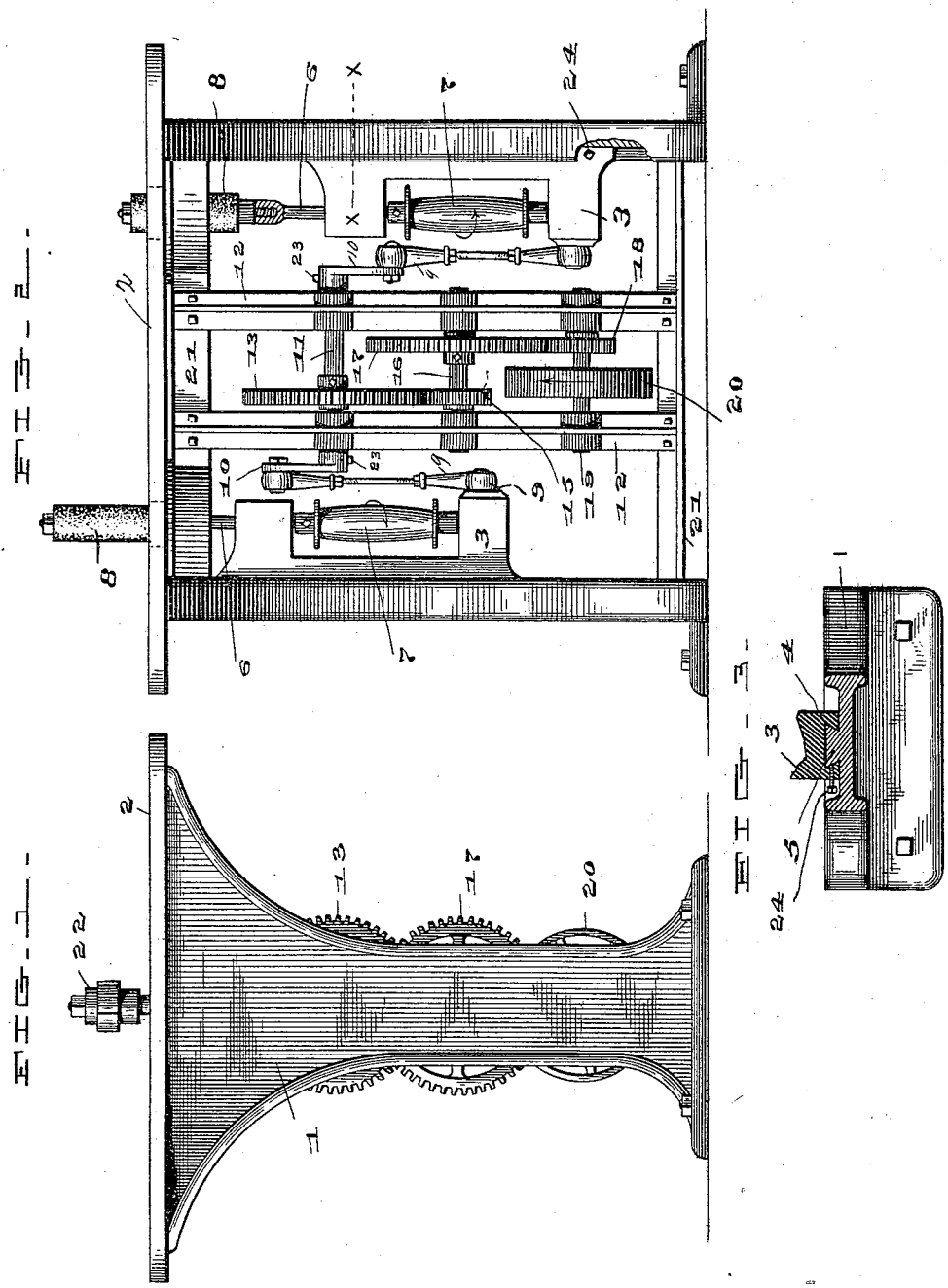
Witnesses
H. D. Nealy.
E. B. Griffith.
Inventor
Luther E. Paine
By his Attorney
C. P. Jacobs.

UNITED STATES PATENT OFFICE.

LUTHER E. PAINE, OF EDINBURG, INDIANA, ASSIGNOR TO THE EDINBURG FOUNDRY AND MACHINE COMPANY, OF SAME PLACE.

COMBINED SANDPAPERING AND FRIEZING MACHINE.

SPECIFICATION forming part of Letters Patent No. 450,337, dated April 14, 1891.

Application filed September 17, 1890. Serial No. 365,243. (No model.)

*To all whom it may concern:*

Be it known that I, LUTHER E. PAINE, of Edinburg, county of Johnson, and State of Indiana, have invented certain new and useful Improvements in Combined Sandpapering and Friezing Machines; and I do hereby declare that the following is a full, clear, and exact description thereof, reference being had to the accompanying drawings, in which like figures refer to like parts.

My invention relates to the construction of wood-working machines which are intended to combine in one device mechanism for sandpapering and for friezing, as may be desired, and will be understood from the following description.

In the drawings, Figure 1 is an end view showing the friezer-heads attached. Fig. 2 is a front view showing the sanding-rolls attached. Fig. 3 is a section on the line $x\,x$, Fig. 2.

In detail, 1 are the uprights of the framework, having a table or top 2. Connected to the uprights are slides 3, having dovetailed grooves 4, which are intended to have a vertical movement on tongues 5, formed on the inside of the uprights. Passing through and having a bearing in the projections of the slides are mandrels 6, upon which are mounted pulleys 7, driven by belts from the source of power, and which operate to revolve the mandrels in the direction of the curved arrows. To the upper end of these mandrels are connected the sanding-rolls 8, the shank of the roll being screwed directly into the socket in the upper end of the mandrel.

The sanding-rolls pass directly through openings in the table, as shown in dotted lines in Fig. 2. 9 is a rod pivoted to the lower projection of the slide and its upper end pivoted to a crank 10, which is mounted on the end of the shaft 11 which carries the gear-wheel 13. This gear-wheel intermeshes with a similar one 15 on the shaft 16, and beyond this a larger gear-wheel 17, mounted on the same shaft, meshes with a smaller gear-wheel 18, mounted on the shaft 19. These shafts 11, 16, and 19 are all parallel to each other, and all are journaled in the upright braces 12. On the lower shaft 19 is also mounted a driving-pulley 20, which is operated by a belt leading to a counter-shaft driven by the engine. The uprights of the frame are connected by upper and lower cross-bars 21.

I will first speak of the operation of the machine when used for sandpapering, as shown in Fig. 2. Power being applied to the driving pulley 20 and to the pulleys 7, it is obvious that motion is communicated through the gear-wheels to the crank 10 and its connecting-rod 9, and the slides 3 are reciprocated alternately on each side of the machine, so that one of the sanding-rolls is up when the other is down, as shown in Fig. 2, the limit of movement being the length of the cranks. At the same time a rotary motion is given the mandrels and sanding-rolls through the pulleys 7. Each of these rolls, therefore, has a compound movement—viz., a reciprocating movement in a vertical plane and a rotary movement in a horizontal plane. Of course either one of the sanding-rolls may be operated alone; but the arrangement and construction herein shown balance the machine on both sides, so that the compound movement given these rolls does does not unequally affect one side of the machine, and different grades of sand-paper may be applied to the rolls, so that either is at once ready for use while the machine is in operation.

When the machine is to be used as a friezer, no vertical movement, but only a rotary movement, of the mandrels is desirable. To change the machine for friezing purposes, the sander-spindles are screwed out right and left from the mandrels and the friezer-heads 22 are screwed into the sockets of the mandrels in the same manner. When these have been set in place, the belt is thrown off from the driving-pulley 20, the gear-pulley 17 is turned by hand until the right-hand slide and friezer-head is at the lowest point of its stroke, the set-screw 23 in the left-hand crank is loosened, and the crank is turned half-way around until the slide and friezer-head on that side is at the bottom of its stroke, the same as the one on the right hand, and the set-screw is then fastened in the crank. Then by turning the driving-pulley by hand the slides 3 and the friezer-heads are raised to the desired height, and the slides are then locked to the uprights by means of set-screws 24.

(Shown in Figs. 2 and 3.) Thus locked, there can be no reciprocating movement of the slides or mandrels, and the only movement possible to the latter is the rotary movement effected through the pulleys 7. Of course it will be understood that where no vertical movement of the mandrels is desired the sander-spindles may be locked in the same manner as above described for the friezers.

The machine is therefore adapted to be operated by a change of tool-heads either as a friezing or sandpapering machine, and in the latter case the vertical movement allowed by the slides, in which the mandrels have a bearing, enables the operator to cover a greater space upon the wood by his sandpapering-rolls than if no such vertical movement were provided for, and the paper wears evenly on its surface.

The ends of the connecting-rod 9 are joined by a central right-and-left screw-rod working in sockets at each end, by means of which it may be adjusted so as to increase or decrease its length, if required, by the thickness of the table-top or any other cause.

I am aware that various machines have been used wherein a rotary and vertical movement is allowed the sanding-rolls, and that friezer-machines allowing a rotary movement of the spindles have been also used; but I am not aware that a machine combining both the features and capabilities of a sanding and friezing machine wherein both a vertical and rotary movement may be given the spindle when the sander-roll is applied and locking the mechanism so that only a rotary movement of the spindle is allowed when the friezer-head is attached have ever been known or used, and these are the essential features of my invention.

What I claim as my invention, and desire to secure by Letters Patent, is the following:

1. A machine adapted for carrying either a sanding-roll or friezer-head, comprising a frame-work, slides movable vertically on the uprights thereof, mandrels revoluble in bearings in such slides, detachable sander-rolls or friezer-heads secured to the upper end of such mandrels, mechanism for revolving the mandrels, and cranks connected to the slides for reciprocating the same, in combination with means for locking the slides when the friezer-head is to be used and no vertical movement desired, substantially as shown and described.

2. A combined machine adapted either for carrying sanding-rolls or tool-heads, comprising a frame-work, slides movable thereon, mandrels seated and revoluble in bearings on such slides, with mechanism for imparting a vertical movement to the slides and also a rotary motion to the mandrels when sanding-rolls are to be used, and a locking device connected to the slides for preventing the vertical movement when friezer-heads are applied to the mandrel, combined in a single machine, substantially as shown and described.

In witness whereof I have hereunto set my hand this 13th day of September, 1890.

LUTHER E. PAINE.

Witnesses:
C. W. DAVIS,
WM. E. DEUPREE.